United States Patent [19]
Watanabe

[11] 3,943,370
[45] Mar. 9, 1976

[54] FRICTION-DRIVE ELECTRICITY GENERATING METHOD AND EQUIPMENT UTILIZING THE DRIVING WHEEL OF MOTOR CARS

[76] Inventor: Tsuguhiko Watanabe, No. 5-13, 1-chome, Ebara-cho, Nakano, Tokyo, Japan

[22] Filed: Aug. 22, 1974

[21] Appl. No.: 499,483

[30] Foreign Application Priority Data
Mar. 1, 1974 Japan.............................. 49-23443
May 16, 1974 Japan.............................. 49-54998

[52] U.S. Cl................................................ 290/1 R
[51] Int. Cl.².......................................... H02P 9/04
[58] Field of Search ............. 290/1; 322/40, 41, 42, 322/43, 44, 29, 12; 307/64, 65

[56] References Cited
UNITED STATES PATENTS

| | | |
|---|---|---|
| 1,528,364 | 3/1925 | Brown................................... 290/1 |
| 2,712,109 | 6/1955 | Graziose ............................... 290/1 |
| 2,716,728 | 8/1955 | Lester.................................... 322/42 |
| 3,544,802 | 12/1970 | Bunell.................................... 290/1 |
| 3,803,421 | 4/1974 | Bunell.................................... 290/1 |
| 3,859,589 | 1/1975 | Rush...................................... 290/1 |

*Primary Examiner*—Herman T. Hohauser
*Attorney, Agent, or Firm*—Saul Jecies

[57] ABSTRACT

A friction-drive electricity generating method and equipment utilizing the driving wheel of motor cars, where, in order to make it possible to generate electricity efficiently for a long period by using the engine power of motor cars, a base plate with a jack attached is fixed to one of driving wheels of the motor car in such a manner that it may be held between them and then a dymamo is installed, removably and tilting freely, on the said base plate so that the driving wheel may be lifted up with the said jack and so that electricity may be generated by pressing the dynamo shaft against the driving wheel while it is being revolved by the motor car engine.

8 Claims, 5 Drawing Figures

FRICTION-DRIVE ELECTRICITY GENERATING METHOD AND EQUIPMENT UTILIZING THE DRIVING WHEEL OF MOTOR CARS

BACKGROUND OF THE INVENTION

The present invention relates to an improvement of the method and equipment for generating electricity by revolving a dynamo by means of the driving wheel of motor cars.

It is well-known in the conventional method and equipment of this kind that a base plate provided with multiple rollers of small diameter in parallel can be driven by one of driving wheels of a motor car and, after all the other wheels are stopped, the said driving wheel is revolved by the motor car engine to turn the small rollers, whose revolution in turn is transmitted directly or indirectly through a flexible shaft to a dynamo shaft, eventually generating electricity.

According to the conventional method and equipment the driving wheel of the motor car on the small rollers loads a part of the motor car body weight and always presses a certain limited surface area of each roller. For this reason, the driving wheel tire is pressed whenever it contacts the small rollers and released whenever it leaves. These actions are repeated throughout electricity generation. As a result, the frictional resistance between the tyre and the small rollers becomes so large that their temperature rises excessively even if operation is continued for only a few minutes or a quarter of an hour, and the process must be halted.

Of course, such over-heating of the tyre and rollers due to frictional resistance may be prevented either by arranging a number of small-diameter rollers in parallel in an arc surrounding the circumference of the tyre to disperse the frictional resistance or by adopting rollers of large diameter. These countermeasures, however, make the equipment heavier and less portable. In particular, the former is awkward as the arrangement of the small rollers must be adjusted in radius according to the tyre diameter, while the latter is not practical as it will be difficult to let the driving wheel ride on the rollers.

Furthermore, even if the overheating problem can be resolved, the said large frictional resistance between the tyre and rollers will make it difficult to achieve high-speed revolution of the driving wheel. When the clutch of a motor car driving on the road is depressed, the driving wheels continue to revolve due to inertia because of the car body weight and speed, permitting gear changes. On the other hand, the driving wheel revolving on rollers has only a small inertia and therefore it will stop so soon that gear changes may not be possible.

Since driving in low gear or second gear thus becomes inevitable, the speed of the driving wheel will have to be raised to the stipulated speed by accelerating the engine, resulting in an increase in noise and fuel consumption.

SUMMARY OF THE INVENTION

In view of the above defects, the primary purpose of the present invention is to offer an improved and satisfactory friction-drive electricity generating method and equipment utilizing the driving wheel of motor cars.

An additional purpose of the present invention is to provide such an electricity generating method and equipment of this kind that may be fixed very conveniently to the driving wheel of motor cars.

Another purpose of the present invention is to offer equipment of this kind that may be split into a base plate part and a dynamo for portability.

A further purpose of the present invention is to offer equipment of this kind that is simple in construction and inexpensive.

In order to achieve the said purposes in the present invention, a flat base plate provided with a notch at one side is employed. After a jack is attached to it, it is fixed to one of driving wheels of the motor car so as to hold the driving wheel by means of the notch. Then, the driving wheel is lifted up with the jack attached to the said base plate, while a dynamo is attached, tilting freely, on the base plate at the other side. Thus, electricity may be generated by revolving the said driving wheel by driving the motor car engine and by pressing the shaft of the said dynamo against the driving wheel.

In this case, since the driving wheel of the motor car is revolved independently of the car body weight, it may be driven at the top gear by changing gear or even from the start. Thus, electricity may be generated while minimizing engine noise and fuel consumption. Furthermore, since the base plate carrying the jack and dynamo has a notch at one side, and since the dynamo is attached removably on the base plate, the present equipment may not only be fixed conveniently to the driving wheel of motor cars but also may be split readily into the base plate part and the dynamo, thus making it readily portable. As a result, it is possible to offer such electricity generating equipment that is simple in construction and inexpensive.

The above and other purposes, features and performances of the present invention will be clarified further by the following explanation, with an application example, referring to the appended figures.

DESCRIPTION OF THE PREFERRED EMBODIMENT

Figure 1:
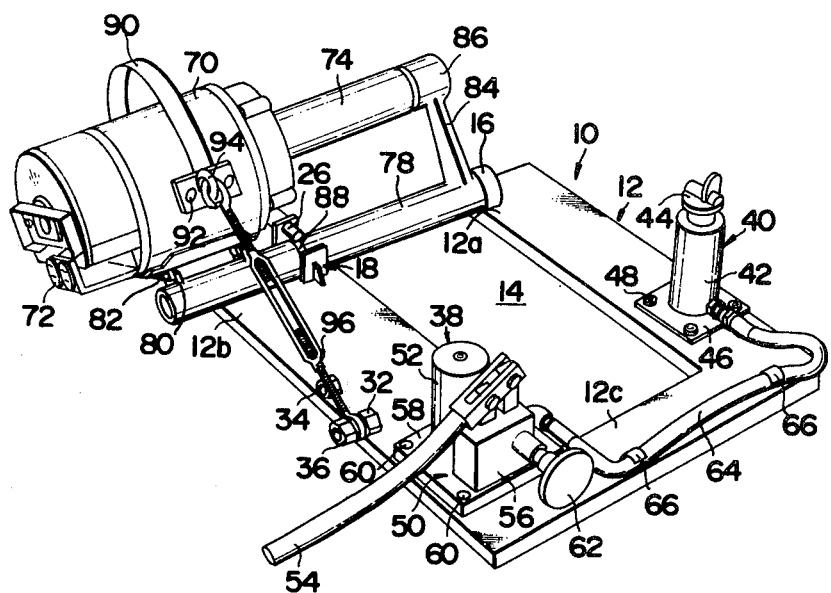
FIG. 1 is a diagonal view showing an application example of the friction-drive electricity generating equipment of the present invention.

In FIG. 1, the diagonal view shows an example of the friction-drive electricity generating equipment 10 utilizing the driving wheel of a motor car according to the present invention. This equipment consists of a base plate 12 with a jack attached and a dynamo 70 installed, removably and tilting freely, on the said base plate 12.

Figure 2:
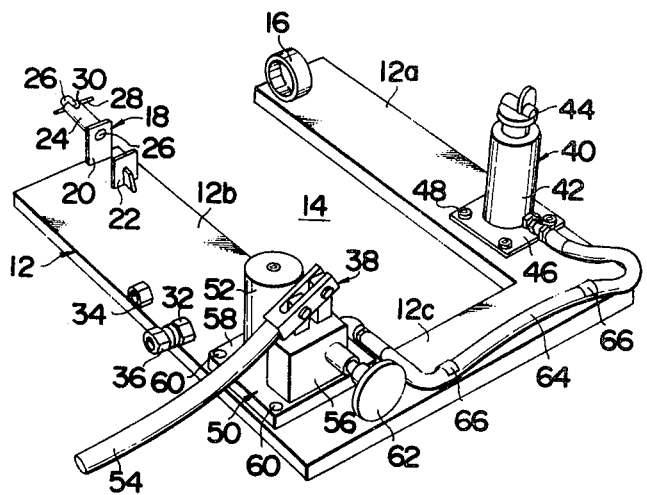
FIG. 2 is a diagonal view of the base plate with the jack attached.

The base plate 12, as seen in FIG. 2, consists of the main plate parts 12a 12b set in parallel at a stipulated distance and an ancillary plate part 12c connecting the said two main plate parts at each end. These parts form a flat plate having a notch 14 at one side. In order to fabricate it as light as possible for portability, it is advisable to make the base plate 12 of thin steel sheet, etc., so as to form a hollow structure.

The main plate parts 12a 12b of the said base plate 12 are provided with a cap body 16 and a fastener 18 at the open mouth ends so as to attach the dynamo 70, removably and tilting freely. The cap body 16 is made of cylindrical material and is fixed to a stipulated position on the main plate part 12a by welding or some other procedure. The fastener 18 consists of two fixing plates 20 22 which face each other and are fixed by welding or some other procedure to the main plate part 12b at the position stipulated according to the said cap body 16 on the other main plate part 12a.

A guide cylinder 24 is fixed as one body by welding or some other procedure to the outside surface of one 20 of the said fixing plates of the fastener 18 and a fastening rod 26 is inserted sliding freely in the horizontal direction through the fixing plate 20 and the guide cylinder 24. The said fastening rod 26 is always pressed towards the other fixing plate 22 by a spring (not shown in the figure) incorporated in the guide cylinder 24. When it is turned to allow a pin 28 set at its base end to fit in a notch 30 bored in the guide cylinder 24 side, it will be protruded by the said spring force to a position where its top end contacts the fixing plate 22. On the other hand, when it is drawn and turned, the pin 28 will be removed from the notch 30 of the guide cylinder 24 and be caught by its edge, while the top end of the fastening rod 26 will be indented from the surface of the fixing plate 20.

Two nuts 32, 34 are fixed by welding or some other procedure to the main plate part 12b of the base plate 12 along the outer edge of the centre part, and a bolt 36 is screwed into these nuts 32, 34 from outside. This bolt 36 forms a turnbuckle supporter.

In this example, a conventional hydraulic jack 38 of separate type consisting of a ram cylinder 40 and a hydraulic pump 50 connected with a hose 64 is employed. The ram cylinder 40 consists of a cylinder part 42 and a ram 44 inserted in it and moving freely. It is fixed to the base part of the main plate part 12a of the base plate 12 with bolts 48 through a flange 46 fixed at the lower end of the said cylinder part 42. The hydraulic pump 50 consists of a storage tank 52 a pump 56 for delivering the hydraulic fluid stored in the said tank 52 to the hose 64 side by the up-and-down operation of its handle 54. The tank 52 and the pump part 56 are both fixed to the base end of the main plate part 12b of the base plate 12 with bolts 60 through a flange 58 arranged at their lower end. In addition, a relief valve (not shown in the figure) for controlling the connection between the tank 52 and the hose 64 is incorporated in the said pump 56 and a pick-up 62 for switching the relief valve protrudes from one side. The hose 64 connecting the said ram cylinder 40 and the pump 50 is fixed with clips 66 midway on the ancillary plate part 12c of the base plate 12.

Thus, when the relief valve of the pump 50 is closed and the handle 54 is operated up-and-down, the hydraulic fluid in the tank 52 will be sent through the hose 64 to the ram cylinder 40 to lift the ram 44. When the ram 44 is lifted and the pick-up 62 is turned to open the relief valve, the ram 44 will descend due to the load thereon while the hydraulic fluid in the cylinder part 42 is passed back to the tank 52 through the hose 64.

Figure 3:
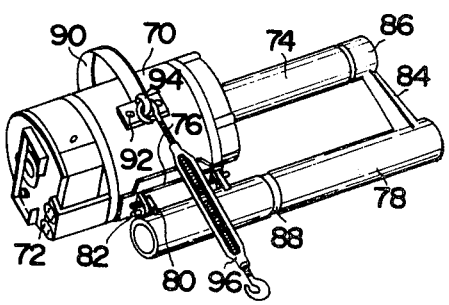
FIG. 3 is a diagonal view of the dynamo.

The dynamo 70 is, as shown in FIG. 3, provided with a plug socket 72 at one side and its shaft 74 extends from the other side. In order to attach the dynamo 70, removably and tilting freely, to the aforementioned cap body 16 and fastener 18 of the base plate 12, the said dynamo 70 is attached with a bracket 76 as one body by welding or some other procedure at the lower surface. Also, the bracket 76 is combined with another bracket 80 protruded from the supporting rod 78 side as one body by means of a bolt 82 so as to fix the supporting rod 78 to the dynamo 70. This supporting rod 78 is made of a material such as round steel rod and extends parallel to the shaft 74 of the dynamo 70. It is attached with a stay 84 as one body by welding or some other procedure near the top. The stay 84 has a head forming a bearing part 86, which supports the top end of the shaft 74 of the said dynamo 70.

The top end of the said supporting rod 78 is inserted, revolving freely, into the said cap body 16 of the base plate 12 side. In this case, a groove 88 is prepared beforehand in the supporting rod 78 part between the fixing plates 20, 22 of the fastener 18 of the base plate 12 side. When the fastening rod 26 of the fastener 18 is protruded from the fixing plate 20, it will fit into the said groove 88 of the supporting rod 78. Thus, the supporting rod 78 is only allowed to revolve when it is prevented from moving in the axial direction by the presence of the fastening rod 26 in the groove 88, so that the dynamo 70 may be attached, tilting freely, to the base plate 12.

In addition, a handle 90 is attached with bolts 92 to the upper part of the said dynamo 70 so as to make it conveniently portable, while a connecting ring 94 is arranged at one of the fastening parts of the handle 90 so as to connect with a turnbuckle 96 at one end. After the dynamo 70 is attached, tilting freely, to the base plate 12 with the cap body 16 and the fastener 18, the turnbuckle 96 is connected at its top end to the bolt 36 screwed into the nut, 32 or 34, of the base plate 12 side so that the dynamo 70 may be turned around the supporting rod 78, tilting freely, as it expands or shrinks. The said shaft 74 of the dynamo 70 is coated along the circumference with rubber of some other material having a large friction coefficient so as to realize an effective friction drive when it is pressed against the driving wheel of motor cars.

The friction-drive electricity generating equipment 10 fabricated as stated above according to the present invention is used in the following manner.

Figure 4:
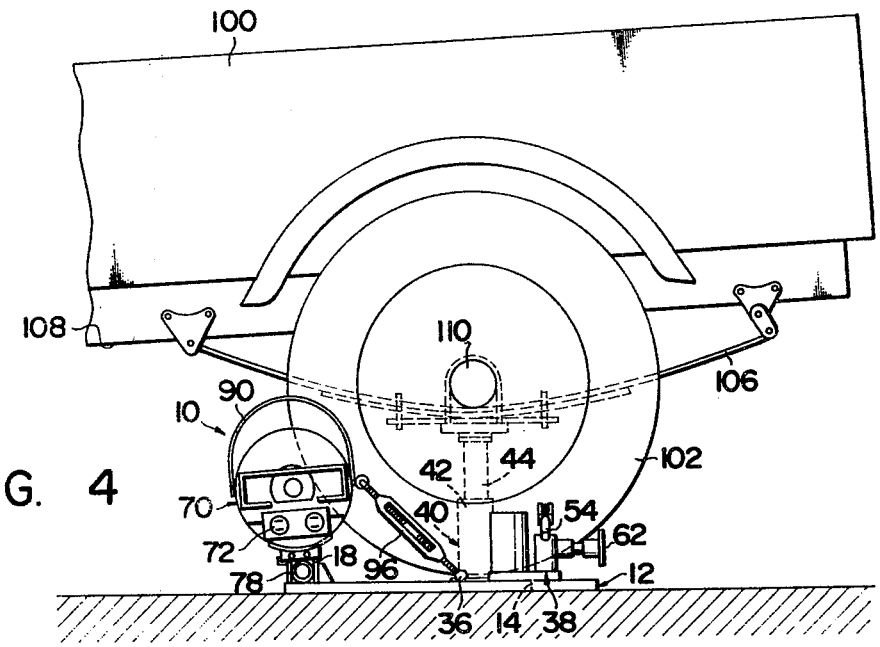
FIGS. 4 and 5 illustrate applications.
Figure 5:
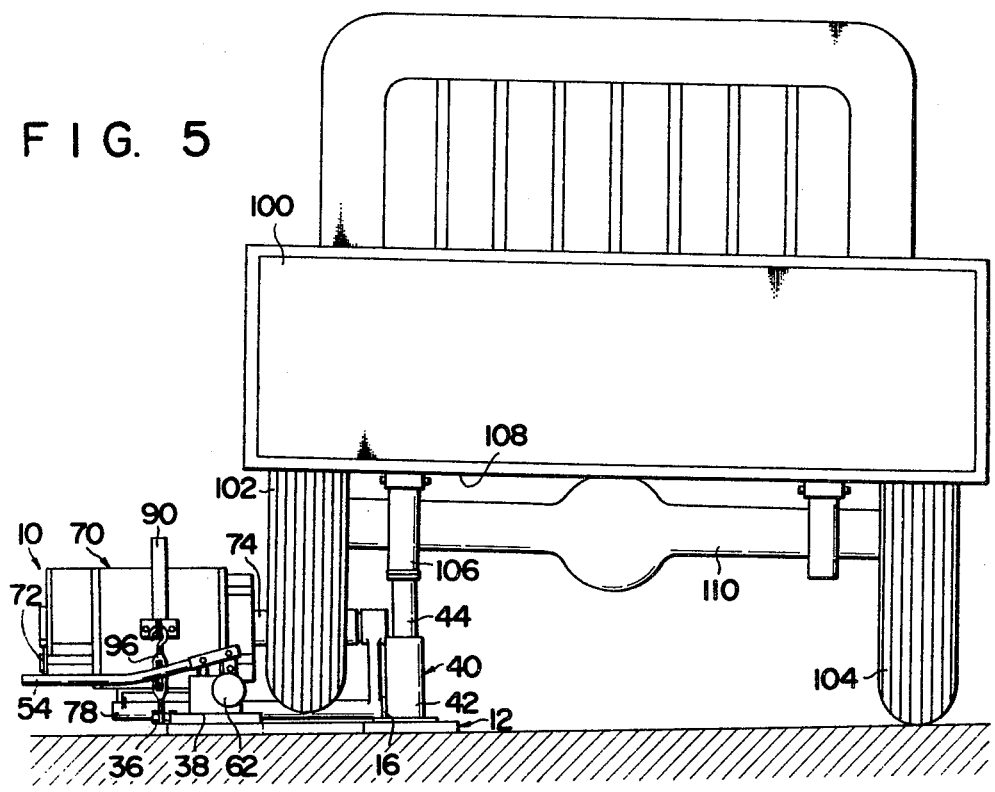

As seen in FIGS. 4 and 5, wheel stoppers (not shown in the figures) are installed on all the wheels of a stopped motor car 100 except one 102 of the driving wheels. Then, the base plate 12 is fixed to the driving wheel 102 not provided with a wheel stopper so as to fit the wheel into the notch 14 of the base plate 12 and so as to let the ram cylinder 40 of the jack 38 fixed on the base plate 12 face the motor car 100 side, for instance, the suspension spring 106.

As the ram 44 of the ram cylinder 40 is lifted from the said position by operating the handle 54 of the jack 38 up-and-down, the suspension spring 106 of the motor car 100 side will be raised by the upper end of the said ram 44 and the driving wheel 102 will be lifted simultaneously. Next, the supporting rod 78 of the dynamo 70 is fitted to the cap body 16 and the fastener 18 of the base plate 12 side so as to attach the dynamo 70, tilting freely, to the base plate 12, while the turnbuckle 96 is fitted at its top end to the bolt 36, a turnbuckle supporter, of the base plate 12. Upon lifting the driving wheel 102 with the said jack 38, if an adequate space is available, depending on the type of the motor car 100, the dynamo 70 may be fixed on the base plate 12 between its lower surface 108 and the base plate 12, prior to lifting the driving wheel 102 with the jack 38.

After that, the dynamo 70 is turned around the supporting rod 78 by manipulating the said turnbuckle 96 so as to press its shaft 74 against the driving wheel 102 of the motor car 100. Then, the driving wheel 102 is revolved by driving the motor car 100 engine. Alternatively, the driving wheel 102 is started first and then the shaft 74 of the dynamo 70 is pressed against it by manipulating the turnbuckle 96. These are adjusted to produce enough friction to permit the shaft 74 of the dynamo 70 to revolve with the revolution of the driving wheel 102 of the motor car 100. Thus, electricity generation may be achieved.

It is advisable to keep the contact position between the driving wheel 102 and the shaft 74 of the dynamo 70 lower than the height of the axle 110 as shown in FIGS. 4 and 5.

In this way, the present equipment 10 may be fixed very easily to the driving wheel 102 of the motor car 100. Furthermore, since the driving wheel 102 of the motor car 100 is driven independently of the weight of the motor car body throughout electricity generation, it becomes possible to change gear or to drive in top gear from the start. Thus, it becomes possible to generate electricity efficiently while keeping the engine revolution rate low, i.e., while minimizing the noise and fuel consumption.

When electricity generation is over, the present equipment 10 may be removed from the motor car 100 by the following procedure. Namely, after the shaft 14 of the dynamo 70 is withdrawn form the driving wheel 102 by manipulating the turnbuckle 96, the top end of the turnbuckle 96 is removed from the bolt 36 of the base plate 12. Then, the dynamo 70 is removed from the base plate 12 by releasing its supporting rod 78 from the fastener 18.

Next, the relief valve pick-up 62 of the jack 38 is opened so that the ram 44 of the ram cylinder 40 descends together with the motor car 100 and the driving wheel 102 descends to the ground. Finally, the base plate 12 is withdrawn from the driving wheel 102 and the dynamo 70 is detached from the base plate 12 so as to permit these parts to be hand-carried separately as necessary. Thus, the present equipment 10 is easily and conveniently portable.

We have explained hitherto a preferred example of the present invention. However, for instance, although a notch 14 is arranged in the base plate 12 so as to facilitate the setting up of the present equipment 10 on the driving wheel 102, the base plate may also be a plain flat plate of square form and attachment to the driving wheel 102 of the motor car 100 or removal from it may be done by driving the motor car 100. In this case, since the base plate itself could be fabricated in the form of a relatively thin flat plate, its attachment or removal would not be very difficult.

As can be seen from the said example, the present invention is applicable in a number of modified forms and methods without deviating from the present principles. It is hoped, therefore, that the following claims will cover all such modified forms and methods that may produce substantially the same effects as the present invention by means of equipment substantially identical or equivalent to that of the present invention.

What is claimed is:

1. A method of generating electricity utilizing a driven wheel of a motor vehicle, comprising the steps of raising a driven wheel of a motor vehicle out of ground contact; pivotally mounting a generator adjacent the periphery of said driven wheel; letting the generator tilt so that a drive shaft of the generator rests against the periphery of said driven wheel and maintaining the drive shaft in contact with periphery so that the wheel rotates the drive shaft to cause the generator to produce electricity while the transmission of frictional forces to said wheel due to the generation of electricity is maintained at a minimum.

2. A method as defined in claim 1, said generator being mounted on a plate having a notch; and further comprising the step of positioning said wheel in said notch preparatory to the generation of electricity.

3. A method as defined in claim 1; and further comprising the step of tilting said generator by means of a turn buckle.

4. A friction-drive electricity generating device utilizing a driven wheel of a motor vehicle, comprising a base plate; means on said base plate for lifting a vehicle tire out of ground contact; a generator mounted on said base plate for free tilting movement relative thereto; means for tilting said generator so that a drive shaft of the generator rests freely under the weight of the generator against the periphery of said driven wheel and the wheel rotates the drive shaft to cause the generator to produce electricity while the transmission of frictional forces to said wheel due to the generation of said electricity is maintained at a minimum, and means for maintaining said drive shaft in engagement with said periphery of said wheel.

5. Device as defined in claim 4 wherein a turnbuckle is utilized as an expandable member connecting the base plate and the generator.

6. Device as stated in claim 4 wherein the shaft of the generator to be revolved by contact with the wheel is coated along its circumference with a material having a large coefficient of friction so as to increase the efficiency of friction driving.

7. Device as stated in claim 4, where the base plate has a notch so as to enable it to be fixed against the driving wheel of a motor car from one side.

8. Device as stated in claim 7, where the lifting means is a jack on the base plate is of the hydraulic and separate type consisting of a pump part and a ram cylinder connected by a hose.

* * * * *